United States Patent [19]

Elton

[11] 4,032,939

[45] June 28, 1977

[54] LENS CARRIER DAMPING MEANS

[75] Inventor: Robert George Elton, Spencerport, N.Y.

[73] Assignee: Eastman Kodak Company, Rochester, N.Y.

[22] Filed: Mar. 16, 1976

[21] Appl. No.: 667,328

[52] U.S. Cl. .............................. 354/197; 354/286; 350/247

[51] Int. Cl.² .......................................... G03B 3/00

[58] Field of Search .......... 354/123, 197, 286, 295; 350/247, 254, 255, 145, 146; 352/142

[56] References Cited

UNITED STATES PATENTS

| | | | |
|---|---|---|---|
| 3,350,023 | 10/1967 | Bundschuh | 242/75.3 |
| 3,594,068 | 7/1971 | Kirstein et al. | 350/255 |
| 3,709,132 | 1/1973 | Farrell et al. | 354/197 |
| 3,882,520 | 5/1975 | Kamp et al. | 354/197 |

*Primary Examiner*—L. T. Hix
*Assistant Examiner*—Alan Mathews
*Attorney, Agent, or Firm*—A. B. Pagel

[57] ABSTRACT

A lens carrier damping device is provided in a camera having a lens carrier that is selectively movable between two alternate positions to change a parameter of the camera's optical system. The two positions of the lens carrier are established by its operative engagement with respective abutment surfaces under the influence of bidirectional spring means that bias the lens carrier in the direction of its movement during the final portion of its movement toward contact with either of the abutment surfaces. The damping device is bidirectionally operable and is adapted to retard the final movement of the lens carrier to thereby cushion its impact against the abutment surface with which it is brought into contact by the spring means. In accordance with a preferred embodiment of the invention, the damping device comprises an arm that is pivoted by the final movement of the lens carrier in opposition to a retarding force exerted on the arm by a viscous substance between the relatively movable bearing surfaces of the arm supporting bearing structure.

3 Claims, 3 Drawing Figures

LENS CARRIER DAMPING MEANS

BACKGROUND OF THE INVENTION

1. Field of the Invention

The present invention relates to cameras of the type having a lens carrier member that is movable selectively to either of two alternate positions to change a parameter of the camera's optical system, and more particularly to a damper device for cushioning the movement of the lens carrier member into contact with two abutment surfaces that establish its alternate positions.

2. Description of the Prior Art

It is well known in the prior art to provide a camera with a lens carrier member that is movable selectively to either of two positions to change a parameter of the camera's optical system. For example, U.S. Pat. No. 3,882,520 discloses a representative camera having a primary lens and a secondary lens that is movable into and out of alignment with the primary lens to change the effective focal length of the camera's objective lens system. Similarly, as also shown in that reference, it is known to move a lens element in the viewfinder between two predetermined alternate positions to change the field of view provided by the viewfinder. Referring still to that reference, the objective lens 24 is moved laterally of its optical axis between two positions defined by abutment members 26 and 28 and the viewfinder lens element 74 is moved along its optical axis to either of two positions defined by abutment members 70 and 72. As is typical in many such arrangements, the movable lens carrier means shown and described in that reference are urged into contact with the appropriate abutment members by a bidirectionally operable toggle spring 50 that biases the lens carrier members in the directions of their respective movements during the final portions of their movement to their selected operative positions. Because the spring means by which the carrier members are biased against the corresponding abutment members must be quite strong to insure proper positioning of the respective lenses, the lens carriers abut against the stop members with considerable impact. This impact produces objectionable noise when the lenses are adjusted to their alternate positions and also tends to produce mechanical shocks and vibrations that may damage the camera mechanism.

SUMMARY OF THE INVENTION

In accordance with the present invention, a lens carrier damper is provided in a camera having a lens carrier member that is selectively movable between two alternate positions established by its contact with respective abutment surfaces under the influence of bidirectional spring means that bias the carrier member in the direction of its movement during the final portion of its movement toward contact with either of the abutment surfaces. The damper is bidirectionally operable and is adapted to retard the final movement of the lens carrier member to thereby cushion its impact against the abutment surface with which it is brought into contact by the spring means. In accordance with a preferred embodiment of the invention, the damper comprises an arm that is pivoted by the final movement of the lens carrier member in opposition to a retarding force exerted on the arm by a viscous substance between the relatively movable bearing surfaces of the arm supporting structure.

The invention, and its objectives and advantages, will become more apparent in the detailed description of the preferred embodiment presented below.

In the detailed description of the preferred embodiment of the invention presented below, reference is made to the accompanying drawings in which.

DESCRIPTION OF THE PREFERRED EMBODIMENT

Because cameras are well known, the present description will be directed in particular to elements forming part of, or cooperating more directly with, apparatus in accordance with the present invention. It is to be understood that camera elements not specifically shown or described may take various forms well known to those skilled in the art.

Figure 1:
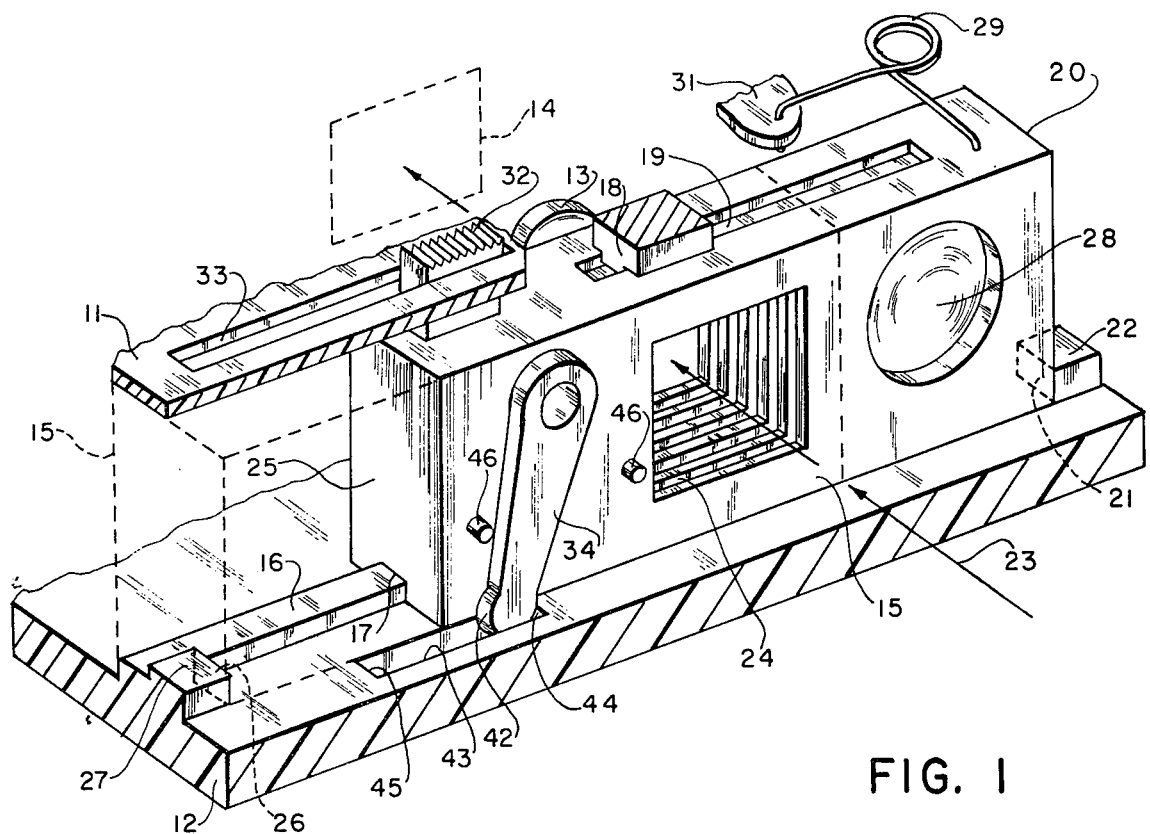
FIG. 1 is a fragmentary perspective illustration depicting a lens carrier damper device according to a preferred embodiment of the present invention incorporated in a camera provided with a primary lens and with a supplemental lens that is carried by a lens carrier adapted to move the supplemental lens between an operative and an inoperative position.

The camera structure shown in FIG. 1 comprises upper and lower camera housing wall members 11 and 12 respectively. A primary objective lens 13 is supported to the housing by means not shown and is adapted to focus an image of an object to be photographed on a film exposure area represented schematically at numeral 14. Lens carrier member 15 is slidably supported between the upper and lower wall members by a key 16 on the lower wall member received in a slot 17 of the carrier member and by a similar but shorter key 18 supported from the upper wall member and received in a slot 19 along the top of the lens carrier member. When the carrier member is in the position illustrated in FIG. 1, defined by the abutment of its end face 20 against the confronting abutment surface 21 of abutment member 22, opening 24 in member 15 is aligned with the optical axis 25 of primary objective lens 13. When the carrier member 15 is moved to its other operative position, shown in broken lines, which is defined by the abutment of its end face 25 against abutment surface 26 of abutment member 27, the axis of supplemental lens 28, carried by member 15, is coincident with the axis of primary objective lens 13 and thereby changes the focal length of the camera's objective lens system. Typically, the focal length of the lens system is increased by the use of supplemental lens 28 to provide a "telephoto" lens option.

A hairpin type toggle spring 29 is connected between the lens carrier member 15 and a spring support member 31. In its depicted position, the toggle spring biases the lens carrier member into contact with abutment member 22. As is well known in the art, when the lens carrier is moved toward its alternate position by means of slide member 32 projecting through slot 33 in the upper camera wall 11, the end of the toggle spring attached to the lens carrier member passes the other end of the spring attached to the spring support member, whereupon the spring biases member 15 in its direction of movement toward abutment member 27.

Figure 3:
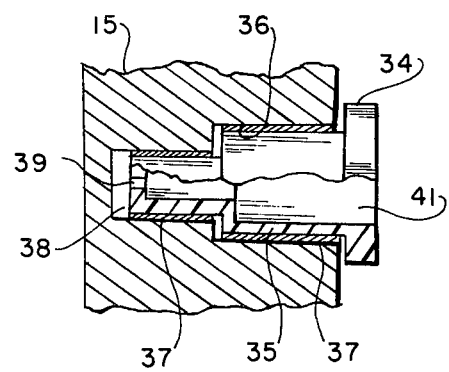
FIG. 3 is an enlarged perspective view of the damper bearing structure, taken along line 3—3 of FIG. 2.

The damper device incorporated in the depicted structure in accordance with the illustrative preferred embodiment of the present invention comprises a damper arm 34 that is pivotally supported to the lens carrier member 15 by means of a stepped pivot shaft 35 received in a corresponding bearing hole 36, best shown in FIG. 3. The radial clearance between the stepped pivot shaft and the bearing hole is filled with a viscous damping fluid 37, for example, Dow No. 200 Silicone Fluid. The radial clearance between the shaft and the hole can be on the order of only a few thousandths of an inch, but this dimension has been greatly exaggerated in the drawings for purposes of illustrating the location of the damping fluid. The provision of the pivot shaft with two concentric bearing surfaces of different diameters is not essential, but tends to prevent the viscous damping fluid from migrating out of the support bearing. The bearing hole 36 extends beyond the end of the pivot shaft to provide the chamber 38 that serves as a reservoir for excess damping fluid. A small vent hole 39 is provided at the end of the central bore 41 of the pivot shaft to allow air to escape from the bearing hole as the pivot shaft is installed therein. Instead of being provided in the damper arm, a similar vent hole obviously could be included in the lens carrier member.

Figure 2:
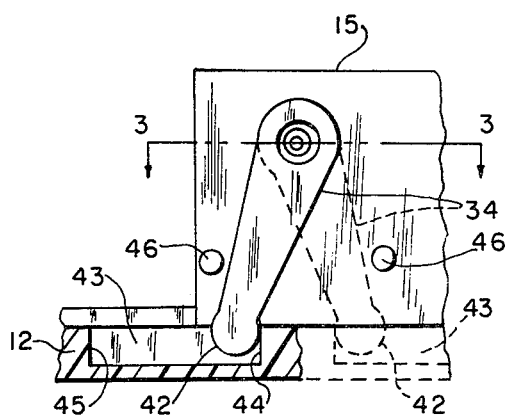
FIG. 2 is an elevational view of a portion of the structure depicted in FIG. 1, illustrating the alternate extreme positions of the damper device.

The end of the damper arm 34 opposite its pivotal support structure is provided with an enlarged rounded head 42, that is partially received in a blind slot 43 in the lower camera housing wall 12. As shown in FIG. 1 and in solid lines in FIG. 2, when the lens carrier member is seated against abutment member 22, the head 42 of damper arm 34 is enlarged with the face 44 of slot 43, which has displaced the damper arm to its illustrated position. As the lens carrier member is moved to its opposite position, the damper arm remains in the position shown in solid lines in FIG. 2 until its head 42 engages the opposite end face 45 of slot 43. This initial portion of the lens carrier's movement comprises somewhat more than one half of its full travel and prevents the damper arm from having any influence on the lens carrier movement until toggle spring 29 has been flexed beyond its neutral position and is then biasing the lens carrier member toward abutment member 27. Thereupon, the engagement between head 42 of the damper arm and end face 45 of slot 43 causes the arm to pivot toward its opposite extreme position.

The radial clearance between the pivot shaft and the bearing bore and the lubricating properties of the damping fluid, cause the damper arm to be subject to very little hysteresis or static friction. However, because rotational movement of the arm is accompanied by shearing of the viscous damping fluid, the force required to rotate the arm is proportional to the speed of such rotation. Because of these properties, which characterize the terms "damper" or "damping" as used herein, the lens carrier member moves relatively slowly as it comes into engagement with abutment member 27 but the damper arm cannot prevent spring 29 from seating the lens carrier positively against the abutment member. When the lens carrier is again shifted to its depicted position in contact with abutment member 22, the damper operates in exactly the same manner just described as arm 34 returns to its original illustrated position. By reference to FIG. 2, it will be apparent that arm 34 is spaced from stop pins 46 in both of its extreme operative positions, the purpose of these pins being to prevent the arm from moving to a position in which its head 42 is withdrawn from slot 43.

Although arm 34 is illustrated as being pivotally mounted to the lens carrier member and engageable with abutment surfaces defined by the camera housing, it should be apparent that this arrangement could be reversed, with the arm being mounted to the camera housing and the abutment surfaces being provided by the lens carrier member. Alternatively, a similar damper structure could be employed in conjunction with a mechanical linkage or the like by means of which the lens carrier member is moved between its alternate positions. Similarly, it should be recognized that a damper according to the present invention is equally applicable to damping the movement of a lens carrier member employed in the camera's viewfinder system or in any other optical system incorporated within the camera. Furthermore, although the use of a viscous fluid as a damping medium has been found to be particularly suitable for this type of application, it should be recognized that other known damping means could also be employed, for example magnetic damping means, dash pot damping means, etc.

The invention has been described in detail with particular reference to a preferred illustrative embodiment thereof, but it will be understood that variations and modifications can be effected within the spirit and scope of the invention.

I claim:

1. In a camera having a lens carrier; a stationary support structure including support means movably supporting said lens carrier; abutment means defining first and second abutment surfaces operatively engageable with said lens carrier to define respective first and second positions thereof; and resilient means adapted to resiliently bias said lens carrier toward at least one of said abutment surfaces with which said lens carrier is then in operative engagement; the improvement comprising: damping means assuming an operative condition during a final portion of the movement of said lens carrier between said two positions to reduce the impact of said lens carrier against the one of said abutment surfaces with which said lens carrier is being brought into operative engagement and assuming an inoperative condition during the initial portion of the movement of said lens carrier between said two positions; said damping means comprising a damping member provided with a cylindrical pivot shaft; bearing means defining a cylindrical bearing bore adapted to receive said pivot shaft with radial clearance between the confronting cylindrical surfaces of said bore and said shaft; a viscous damping fluid located in said radial clearance between said bore and said shaft; and damper rotating means causing pivotal movement of said damping member relative to said bearing means in response to said final portion of the movement of said lens carrier between said two positions.

2. The improvement as defined in claim 1 in which said damping member is mounted to said lens carrier by said bearing means and comprises an arm carried by said pivot shaft; contact means providing said arm with two oppositely facing contact faces; said damper rotating means including means defining two arm displacing surfaces located in fixed relation to said support structure and adapted to be engaged by respective ones of said contact faces to cause the final portion of the movement of said lens carrier in either direction to pivotally displace said arm in a rotational direction determined by the simultaneous direction of movement of said lens carrier.

3. The improvement defined in claim 2 in which said two contact faces and said two arm displacing surfaces are spaced to provide lost motion between the movement of said lens carrier and the pivotal displacement of said arm, whereby both of said contact faces are disengaged from said arm displacement surfaces during the initial portion of the movement of said lens carrier in either direction between said first and second positions.

* * * * *